United States Patent [19]
Williams et al.

[11] Patent Number: 5,777,862
[45] Date of Patent: Jul. 7, 1998

[54] FAULT CONTROL CIRCUIT FOR SWITCHED POWER SUPPLY

[75] Inventors: Kevin Michael Williams, Indianapolis; John Barrett George, Carmel, both of Ind.

[73] Assignee: Thomson Consumer Electronics, Inc., Indianapolis, Ind.

[21] Appl. No.: 749,701

[22] Filed: Nov. 15, 1996

[51] Int. Cl.$^6$ .................... H02H 7/122; H02M 3/335
[52] U.S. Cl. ............................................ 363/56; 363/21
[58] Field of Search ............................ 363/21, 56, 57, 363/58, 65, 71, 22; 361/87, 100, 18, 90; 307/44, 53, 64, 86, 87

[56] References Cited

U.S. PATENT DOCUMENTS

| | | | |
|---|---|---|---|
| 4,177,389 | 12/1979 | Schott | 307/64 |
| 4,546,423 | 10/1985 | Seki | 363/56 |
| 4,685,020 | 8/1987 | Driscoll et al. | 361/18 |
| 5,055,703 | 10/1991 | Schorwalk | 306/64 |
| 5,122,726 | 6/1992 | Elliott et al. | 323/272 |

*Primary Examiner*—Adolf Berhane
*Attorney, Agent, or Firm*—Joseph S. Tripoli; Joseph J. Laks; Marion P. Metelski

[57] ABSTRACT

A voltage source, a transformer and a switching controller are coupled for switched mode generation of a regulated output supply voltage. A switching circuit responsive to an on/off signal turns the power supply on and off by establishing a conductive condition in a conductive path. A fault detector establishes a non conductive condition in a part of the conduction path responsive to an overload condition. A delay circuit establishes a conductive condition in an auxiliary conduction path for a period of time after the power supply is turned on. The auxiliary conduction path becomes non-conductive when the fault detector establishes a conductive condition in the part of the conduction path. The part of the conduction path remains conductive absent an overload condition. A latch arrangement including the delay circuit maintains the non conductive condition in the auxiliary conduction path until the power supply is turned off.

14 Claims, 5 Drawing Sheets

FAULT CONTROL CIRCUIT FOR SWITCHED POWER SUPPLY

BACKGROUND OF THE INVENTION

1. Field of the Invention

The invention relates to the field of switched mode power supplies for apparatus having a run mode and a standby mode of operation, such as a television receiver. In particular, the invention relates to the field of controlling switched power supplies in such apparatus during current overload conditions by utilizing a control circuit otherwise present for switching the power supply, for example an auxiliary power supply, on and off when changing between the run and standby modes of operation mode.

2. Description of Prior Art

In a typical run/standby power supply, for example as used in television receivers, a bridge rectifier and a filter capacitor provide a raw DC voltage (called the $B^+$ voltage, or raw $B^+$), whenever the power supply is coupled to the domestic mains. Standby mode loads can be powered directly from the $B^+$ voltage or from another voltage that is always present. Many run mode loads, however, are powered through a voltage regulating supply such as a switched mode supply, that operates only in the run mode. The run mode power supply for certain loads, such as the deflection circuits and high voltage screen loads, typically employ the flyback transformer that powers beam deflection. A separate or auxiliary power supply also can be operated as a switched mode supply and may provide a regulated $B^+$ voltage for the flyback transformer as well as other auxiliary supply voltages.

Projection televisions, for example, have particularly demanding power needs because they have three high power cathode ray tubes (CRTs). An auxiliary power supply is useful to power the convergence amplifiers for the tubes, two such amplifiers generally being required for each CRT. These amplifiers require positive and negative polarity voltages and can dissipate substantial power.

In a switched mode supply, an input DC voltage (such as the $B^+$ voltage in a television) is coupled to one terminal of a primary winding of a transformer and the other terminal of the primary winding is coupled to a switching device, such that current is coupled to the transformer when the switching device conducts. The switching device is alternately turned on and off during the run mode of operation, providing alternating currents in secondary windings of the transformer, which are rectified and filtered to provide run mode supply voltages.

Regulation of the output voltages is achieved by feedback control provided by, for example, a feedback winding of the transformer. The respective secondary windings are closely coupled, so that load variations on any of the secondary windings are reflected on the feedback winding. The feedback control compares a voltage on the feedback winding with a standard or threshold voltage level, which may be provided by the switching device, and modulates the frequency and/or pulse width at which the switching circuit is turned on and off. The switching device is compensated to render it insensitive to variation of the raw $B^+$ input voltage, while maintaining accurate output voltage levels as current loading varies over a nominal range of power consumption.

The switching device for a power supply as described can be an integrated circuit (IC) power supply controller from the Sanyo STK730 series. This controller includes a FET power switching transistor, an error amplifier and driver, and an over-current protection circuit in a single package. When coupled into a switched mode supply and first turned on, current from the $B^+$ voltage flows to ground through the primary winding of the transformer, the FET and a current sensing resistor. Current increases until the over-current protection circuit in the controller IC is triggered, whereupon the IC controller turns off its FET power transistor. Energy is transferred to the secondary windings of the transformer, where the induced AC current is rectified and charges filter capacitors. After a starting interval of several cycles, the output voltage reaches its regulated level. A threshold comparison circuit provided by the IC controller is coupled to a feedback winding of the transformer and controls the timing of switching by the control IC to maintain the regulated output voltage level. Oscillation stabilizes at a frequency and duty cycle that accommodate the loads coupled to the secondary windings. Many other power supply controllers operate in a similar fashion and may be used instead of the Sanyo STK730 series.

Such an IC controller will attempt to start whenever the raw $B^+$ voltage is present. Other switched circuits control switching between the standby mode and the run mode. If during the run mode of operation loading increases on the power supply outputs, the power supply will attempt to provide more current for keeping the feedback winding voltage equal to the control threshold. If a fault condition occurs, such as a current overload, the overcurrent fault protection circuit of the IC controller, which normally limits current during start-up, becomes operative to limit the power coupled through the supply. The current limiting circuit shuts off the switching transistor before the feedback control senses that the feedback winding voltage is at the control threshold. As a result, the output voltages fall below nominal, to increasingly lower levels with increased current loading.

Assuming a complete short circuit fault condition on the output, the IC controller overload circuit promptly shuts off conduction and little power is actually coupled through the supply. However, if there is a current overload but not a complete short circuit, substantial power is still coupled through the supply even as the output voltages drop. This is an undesirable operating condition, even a potentially dangerous operating condition.

SUMMARY OF THE INVENTION

It would be advantageous to shut the auxiliary power supply down entirely when the output is overloaded, as the auxiliary power supply would be shut down in the standby mode of operation, for example, instead of allowing the controller IC to operate the auxiliary power supply in an overloaded and/or other fault condition. However, some provision must be made to permit operation of the current limiting circuits in the IC controller to enable the power supply to start-up. Otherwise, the low voltage output condition which occurs during power supply start-up can be incorrectly identified by a fault detection circuit to be a low voltage condition resulting from a current overload fault condition. The auxiliary power supply would never start.

This problem can be solved in an elegant fashion when an auxiliary power supply is otherwise provided with a switch control for turning the auxiliary power supply on and off as the apparatus changes between the standby and run modes of operation.

In accordance with an inventive arrangement, such a switch control is modified so as to also be responsive to a fault condition detector, such as a low voltage and/or overcurrent detector, each of which conditions can be indicative of a fault condition, such as a short circuit. The fault condition detector utilizes a level-shifting mechanism to compare a negative output voltage to a positive reference voltage.

In accordance with a further inventive arrangement, a delay circuit is interposed between the fault condition detector and the switch control, which becomes effective after the auxiliary power supply has been turned on. The fault condition detector is thereby prevented from disabling the auxiliary power supply for a period of time after the auxiliary power supply has been turned on, to provide an opportunity for the auxiliary power supply to establish an operating output voltage without a false indication of a fault condition.

An arrangement for detecting an overload condition on a switched power supply which utilizes bias voltages of uniform polarity, wherein a conductive condition of a conduction path determines the on/off status of the power supply, comprises: a source of an output voltage; a circuit for shifting the level of the output voltage; and, a switch device responsive to the circuit for establishing a non-conductive condition in the conduction path, thereby turning the switched power supply off.

The bias voltages may have a positive polarity. The output voltage may have a negative polarity.

The circuit may comprise a Zener diode, and the switch device may comprise a transistor. The anode of the Zener diode is coupled to the source, and the cathode of the Zener diode is coupled to a base of the transistor. The transistor turns on to establish the non-conductive condition in the conduction path.

A switched power supply which utilizes bias voltages of uniform polarity, wherein a conductive condition of a conduction path determines the on/off status of the power supply, comprises: first and second voltage sources for providing, respectively, first and second output voltages; a Zener diode coupled between the first and second sources for providing a bias voltage which tracks one of the first and second output voltages; and, means for comparing the bias voltage with a reference voltage; whereby a non-conductive condition is established in the conduction path when the bias voltage exceeds the reference voltage.

The first and second output voltages may have opposite polarities. The reference voltage may have a positive polarity. The reference voltage may have a polarity opposite to the polarity of one of the first and second output voltages.

The comparing means may comprise a transistor. The transistor may be of a bipolar-junction type, and the reference voltage may comprise a turn-on voltage of the base-emitter junction of the transistor.

DETAILED DESCRIPTION OF THE PREFERRED EMBODIMENTS

Figure 1:
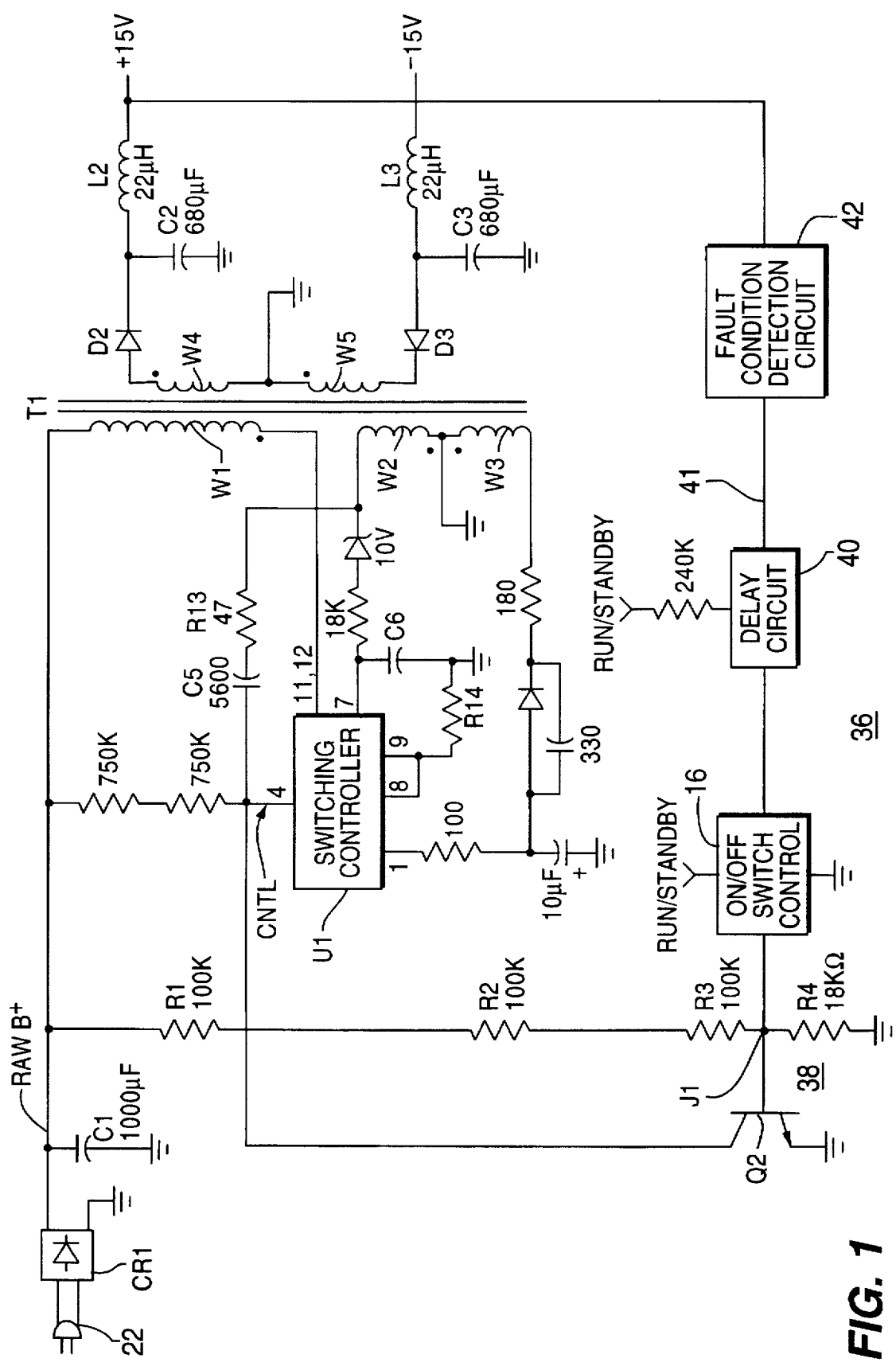
FIG. 1 is a block diagram of an auxiliary power supply having control circuitry in accordance with inventive arrangements.

FIG. 1 generally shows an inventive switched mode power supply 10 having a switching controller U1 operable periodically to apply current from a voltage input, for example a raw $B^+$ voltage, to a primary winding W1 of a transformer T1 for variably coupling power to one or more secondary windings W2, W3, W4 and W5 of transformer T1. The switching controller U1 can comprise, for example, a Sanyo STK730 series controller. Switching controller U1 conducts when a driving voltage, for example the raw $B^+$ voltage, is available on its control input CNTL at pin 4.

The raw $B^+$ input supply voltage is a direct current voltage obtained from the output of a bridge rectifier CR1 filtered by a capacitor C1. The raw $B^+$ voltage is present whenever the power supply 10 is coupled to the domestic mains 22 (i.e., plugged in). However, the power supply 10 only operates in a run mode, and is disabled in a quiescent or standby mode.

When power supply 10 is plugged in and is also in the run mode, the raw $B^+$ voltage is present at the control input CNTL of switching controller U1, thus enabling switching controller U1 to conduct a current through the primary winding W1 of transformer T1. The current flow through winding W1 induces a voltage across winding W2 of transformer T1, which voltage is applied to the control input CNTL through resistor R13 and capacitor C5. The polarity of winding W2 is such that the voltage induced across winding W2 keeps switching controller U1 conducting.

Switching controller U1 ceases conducting current through primary winding W1, or turns off, when the current conducted by switching controller U1 reaches a current limit threshold that is set by the combination of resistor R14 and capacitor C6. When switching controller U1 ceases conducting, the magnetic field of primary winding W1 collapses, its polarity reverses and the energy contained in primary winding W1 is transferred to windings W4 and W5, which supply power to the +15 V and −15 V, respectively, outputs.

As the energy from windings W4 and W5 becomes exhausted, their magnetic fields collapse and their polarities reverse. In accordance with the polarities of windings W2, W4 and W5, winding W2 provides a positive voltage to pin 4 of switching controller U1, thereby enabling switching controller U1 to once again conduct current through primary winding W1 until the current limit threshold of switching controller U1 has been reached and switching controller U1 ceases conducting current. Energy is then again transferred from primary winding W1 to windings W4 and W5. This process repeats for several cycles, until the operation of power supply 10 has stabilized.

Feedback winding W3 controls the duty cycle of switching controller U1 after the operation of power supply 10 has stabilized. The voltage developed across feedback winding W3 is compared with an internal reference, equal to approximately −40.5 V, developed by switching controller U1. The duty cycle of switching controller U1 is modulated such that the voltage developed across feedback winding W3 is maintained approximately equal to −40.5 V. Feedback winding W3 is coupled to the secondary windings W4 and W5 so that load changes are reflected in the voltage developed across feedback winding W3. Thus, feedback winding W3 is also used to regulate the output voltages developed by windings W4 and W5.

Normally, switching from the standby mode to the run mode or vice versa is accomplished under user control via control inputs (not shown) such as an infrared receiver, panel switches or the like. According to an inventive aspect, additional run/standby switching circuits 36 are provided to shift the power supply 10 between the operational run mode and the non-operational standby mode. Switching controller U1 requires a large start-up current. For dependable starting and assistance in developing this drive current, the run/standby switching circuits 36 include a first circuit 38 coupled between the raw $B^+$ voltage input and the control input CNTL, for providing a voltage bias to enable conduction by the switching controller whenever the raw $B^+$ voltage input is present.

In accordance with an inventive arrangement, the drive current bias provided from first circuit 38 can be shunted away to reduce the available drive current to disable the switching controller U1. The drive current can be shunted to a source of reference potential, for example ground.

The run/standby switching circuits 36 further comprise a fault condition detection circuit 42 coupled to at least one of the transformer secondary windings W4 and W5. The circuit 42 senses a fault condition, such as current overloading on the auxiliary power supply, for example by sensing a low voltage threshold on the output coupled to the same or another secondary winding W4 or W5. The circuit 42 generates an output 41 indicative of a fault condition to disable conduction of switching controller U1 by pulling control input CNTL of switching controller U1 to a ground potential, as a means for switching the auxiliary power supply off, as though the apparatus had been changed to the standby mode of operation. In order to make certain that the startup phase of the auxiliary power supply is not prevented by a false detection of a fault condition, due to initial low voltage output levels, a delay circuit 40 inhibits the effect of the output of the fault condition detection circuit 42 for a sufficient period of time for the nominal output voltage levels of the auxiliary power supply to be established.

Figure 2:
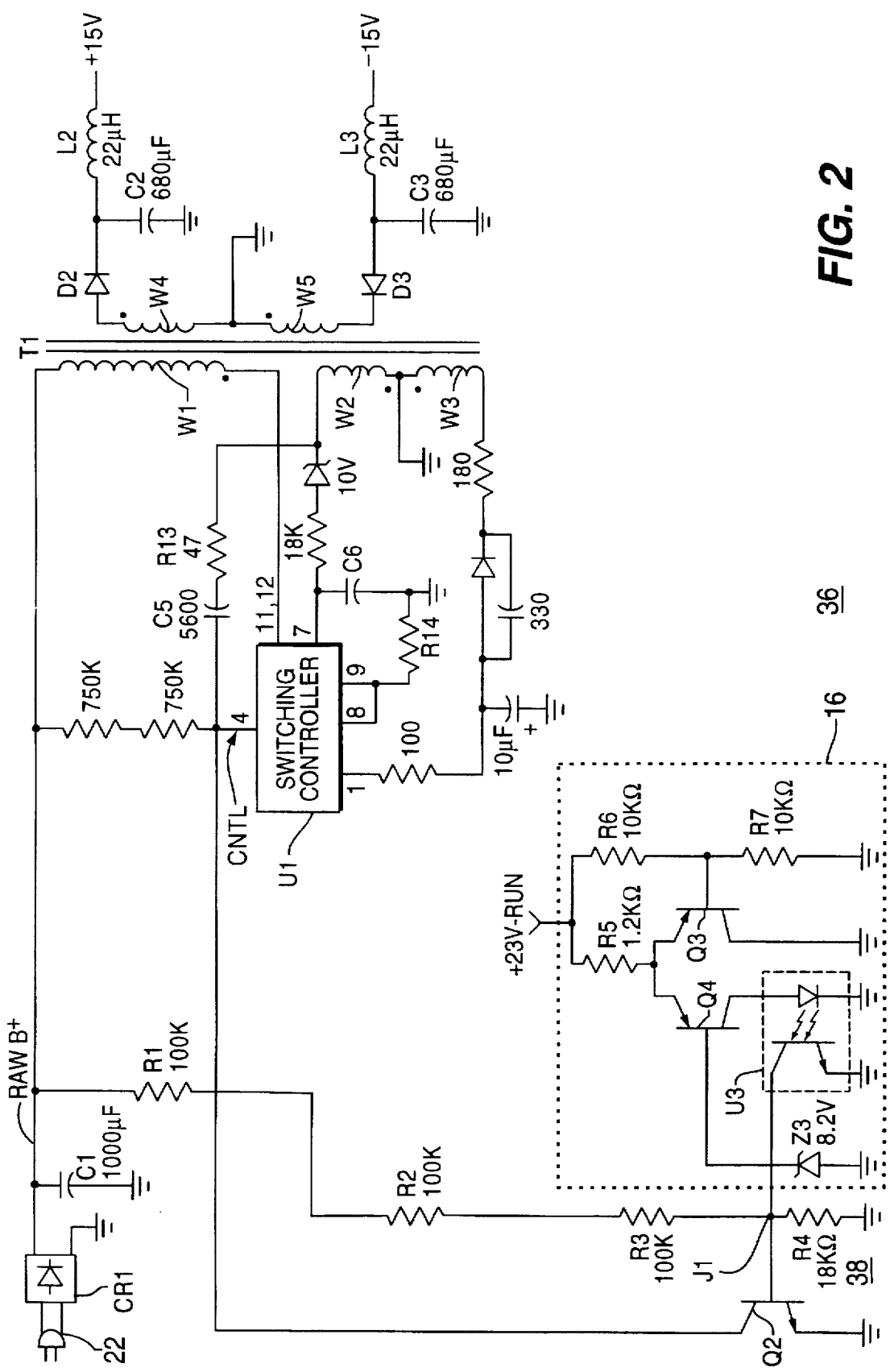
FIG. 2 is a schematic diagram of the auxiliary power supply having control circuitry in accordance with inventive arrangements and illustrating on/off control in more detail.

FIGS. 2-5 illustrate in detail different aspect of the inventive arrangements shown generally in FIG. 1. The same reference numbers are used throughout the drawings to refer to the same or comparable elements. Referring to FIG. 2, switching controller U1 is coupled in series with primary winding W1 of transformer T1. Switching controller U1 alternately conducts and turns off, for transferring power to the secondary windings W4 and W5, where the resulting AC signal is rectified by diodes D2 and D3 and filtered by capacitors C2 and C3, respectively. The filtered voltages provided on windings W4 and W5 are further filtered by chokes L2 and L3, respectively, to provide operational supply voltages $-15$ V and $-15$ V, respectively, for powering loads in the run mode.

The polarities of secondary windings W4 and W5 are opposite that of the primary winding W1, as shown in FIG. 2, such that capacitors C2 and C3 are charged when switching controller U1 turns off and the energy stored in the primary winding W1 of transformer T1 is transferred to windings W4 and W5.

According to an inventive aspect, the power supply 10 as shown is arranged to further control the voltage at control input CNTL of switching controller U1 for controlling shifts between run and standby modes. When the device is in standby mode and switching controller U1 is not conducting periodically, the only power going into the power supply 10 is the raw $B^+$ voltage, which is present because the device is coupled to domestic mains 22. It would be possible in controlling run/standby operation to couple and decouple the raw $B^+$ voltage to the switching elements of the power supply 10 using a relay or other switching device powered from a supplemental low power supply (not shown). However, according to the invention a more cost effective solution is obtained by using a signal derived in part from the raw $B^+$ voltage and in part from the run mode voltages, to reduce the bias on control input CNTL to switching controller U1, namely to bring the voltage on the control input to near ground to hold switching controller U1 off until normal bias is restored.

Thus, a voltage divider comprising resistors R1, R2, R3 and R4 is coupled between the raw $B^+$ voltage and ground, and the junction J1 of the voltage divider is coupled to the base of a switching transistor Q2, having its collector coupled to the control input and its emitter grounded. When the raw $B^+$ voltage is present, control input CNTL is pulled to near ground by conduction of transistor Q2. When the power supply 10 is first coupled to the mains, it is held in standby mode.

The invention is advantageously applied to an auxiliary power supply such as the auxiliary supply of a television for powering run mode loads such as convergence amplifiers. For switching into the run mode, the inventive power supply senses the presence of a run mode supply voltage developed from a source other than the secondary windings of transformer T1. This run mode supply voltage is compared to a threshold level, and when the threshold level is passed, transistor Q2 is turned off, permitting the bias on control input CNTL of switching controller U1 to return to normal and permit operation of the auxiliary power supply in the run mode, namely under feedback control by feedback winding W3 of transformer T1. For example, the $+23$ V supply that is developed by the run mode operation of the deflection and other circuits in a television can be used for this purpose.

Referring to FIG. 2, a differential pair of PNP transistors Q3 and Q4 have their emitters coupled to the run mode supply voltage by resistor R5, and differentially compare the level of the run mode supply voltage, via the voltage divider of resistors R6 and R7 on the base of transistor Q3, with a reference voltage of $+8.2$ V provided by Zener diode Z3 on the base of transistor Q4.

When the run mode supply exceeds a level determined by the ratio of resistances in the voltage divider, transistor Q4 conducts and switches on optocoupler U3. The phototransistor of optocoupler U3 grounds the base of transistor Q2, which ceases conducting, thereby permitting normal bias on control input CNTL of switching controller U1. Operation of the power supply 10 then commences in the run mode responsive to the voltages on the secondary windings W2 and W3 of transformer T1.

Figure 3:
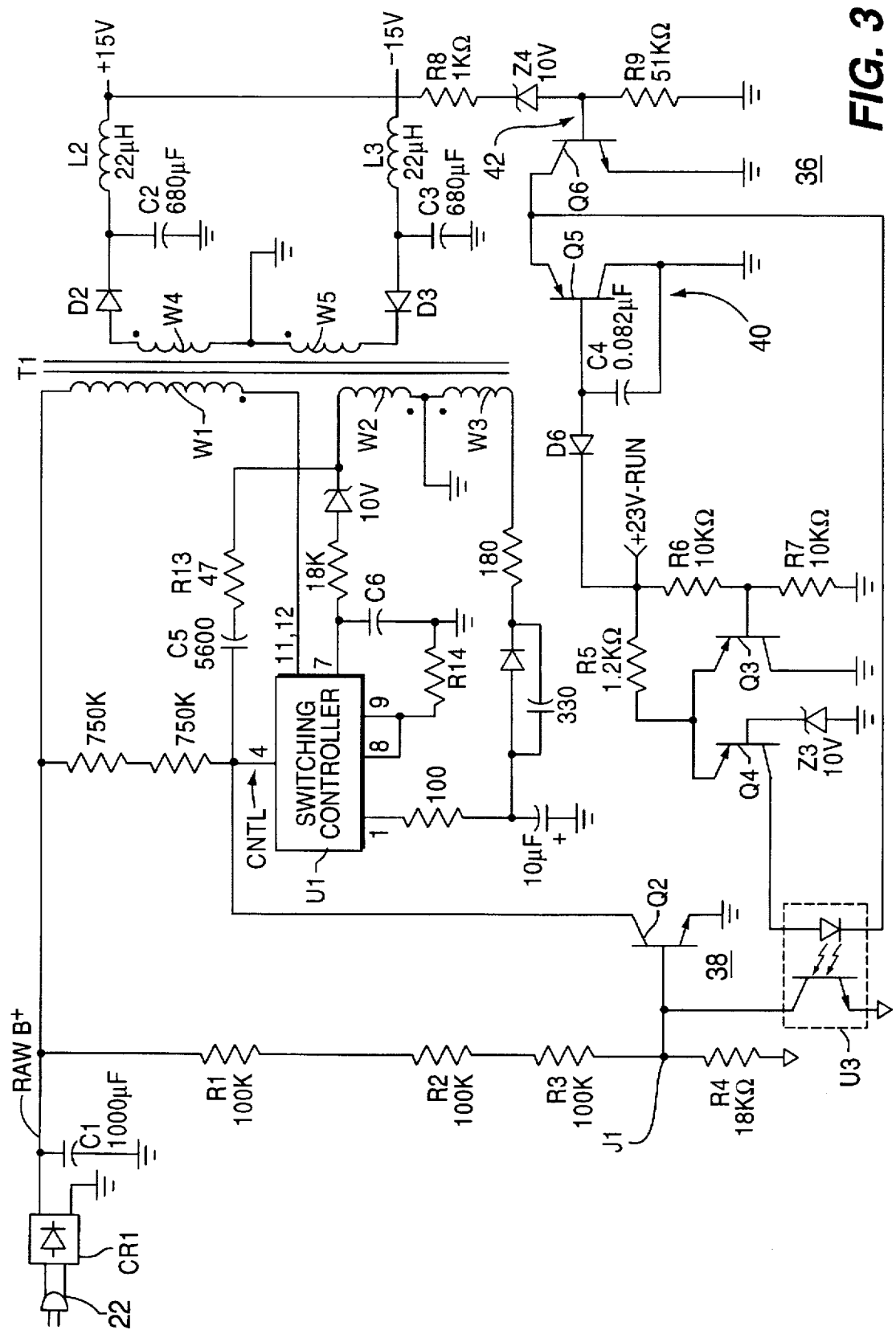
FIG. 3 is a schematic diagram of an auxiliary power supply having control circuitry in accordance with inventive arrangements and illustrating start up and fault detection circuitry in more detail.

Another inventive embodiment is shown in FIG. 3, and includes a latching circuit that has the additional function of detecting current overload conditions, when in the run mode, for switching the power supply 10 into the standby mode. Current overloading causes the output voltage level to drop below nominal, because in overcurrent conditions the overcurrent protection circuits of switching controller U1 turn switching controller U1 off before sufficient power has been coupled through the power supply 10 to maintain the nominal output voltage level. This method of current limiting is less than optimal for powering loads such as the digital convergence amplifiers of a projection television. For such loads, it is advantageous if the power supply 10 can be turned off when an overcurrent condition occurs, instead of attempting to supply current to the loads at reduced voltage.

According to the invention, this function is achieved in a manner that interfaces with the circuits controlling switching between the run and standby modes as in FIG. 2.

In FIG. 3, control for switching from standby to run mode is provided in part by the run mode supply voltage, such as the +23 V run supply, passing a predetermined voltage as determined by the differential transistor pair Q3 and Q4, which provide current to the LED of optocoupler U3. The phototransistor of optocoupler U3 then turns off transistor Q2 and permits operation of switching controller U1. Resistors R1, R2, R3 and R4 provide bias to transistor Q2 at junction J1 from the raw B⁺ supply voltage. In comparison to the embodiment of FIG. 2, in which the cathode of the LED in optocoupler U3 is grounded, according to FIG. 3, the current through the LED charges a capacitor C4, through the base of a PNP transistor Q5.

Capacitor C4 provides for a delay upon first switching from the standby mode into the run mode, in which the power supply 10 can start up. When the supply 10 is running and the regulated voltage, in this case nominally +15 V, exceeds approximately +10 V, Zener diode Z4 conducts through resistors R8 and R9, and turns on transistor Q6. The current from optocoupler U3 is then shunted to ground through transistor Q6 and capacitor C4 stops charging. Transistor Q5 is then off and capacitor C4 cannot discharge through either transistor Q5 or through diode D6, which is coupled to the +23 V run mode supply and is reverse biased.

In the event that the +15 V output voltage falls below the level needed to cause Zener diode Z4 to conduct, especially in the case of a current overload on secondary winding W4, transistor Q6 turns off due to insufficient base drive. With transistor Q6 off, capacitor C4 can charge from the current through optocoupler U3. When the charge on capacitor C4 reaches approximately +10 V, transistor Q5 turns off, and there is no path for the current through optocoupler U3. In that case, although differential transistors Q3 and Q4 still detect the presence of the +23 V run supply, no current is conducted by the phototransistor of optocoupler U3. The raw B⁺ supply turns on transistor Q2 due to the voltage divider formed at junction J1 by resistors R1, R2, R3 and R4. The control input CNTL of switching controller U1 is pulled low. The power supply 10 shuts off, protecting the loads coupled to the outputs. Thus, unlike a power limiting solution wherein the current limiting circuits of the switching controller reduce the output voltage below nominal but continue to supply power, the inventive circuit as described switches off the power supply 10 in overcurrent conditions. This is accomplished using the run/standby circuits driven from the raw B⁺ power supply, providing a current overload protective function with a minimum of parts and complexity.

As illustrated in FIGS. 1 and 3, fault condition detection circuit 42 is utilized to detect current overload conditions on the +15 V output of power supply 10. Detection of overload conditions on the −15 V output is complicated by the fact that exclusively positive-polarity biasing voltages, for example raw B⁺, are used in power supply 10.

Figure 4:
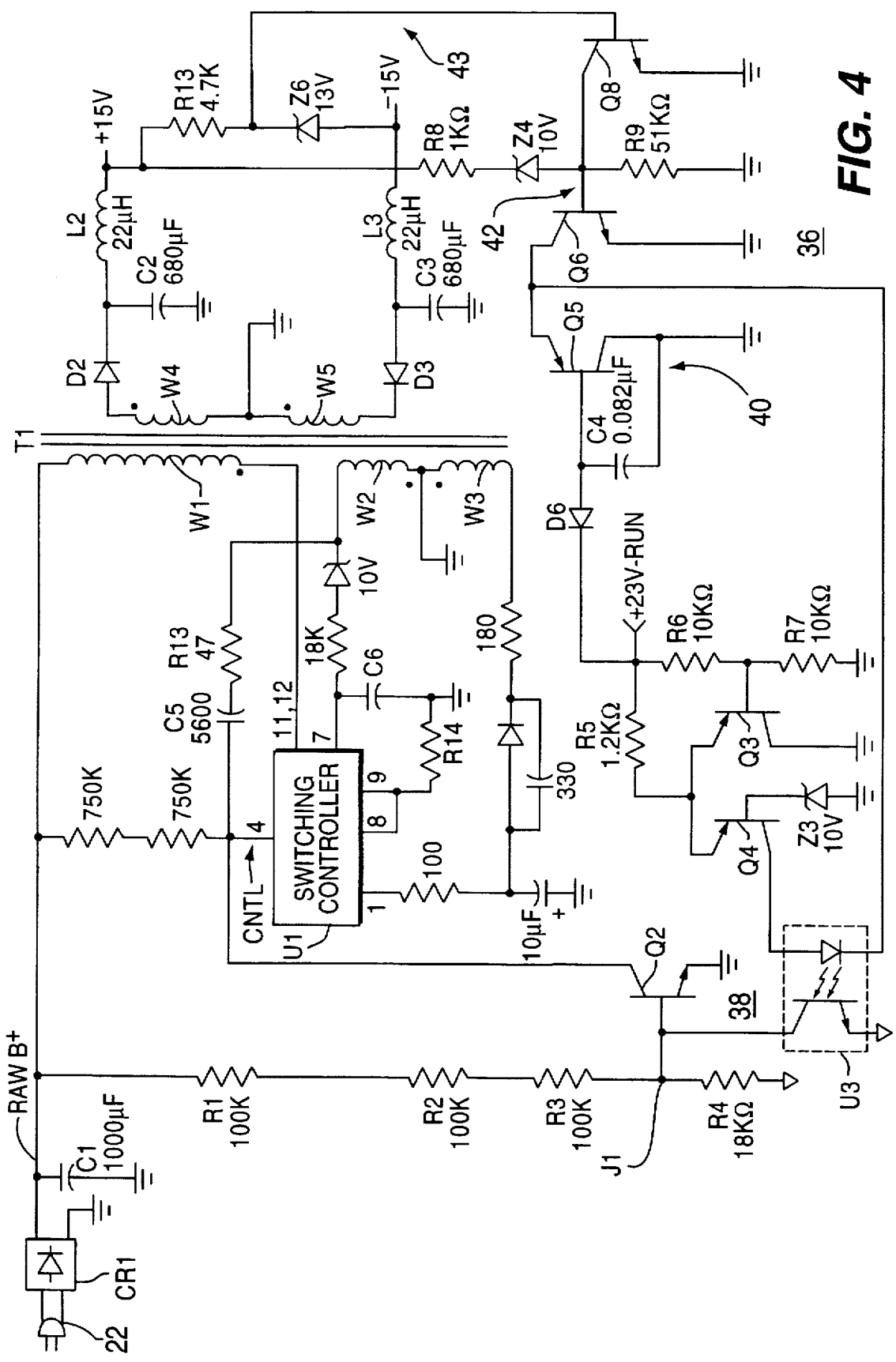
FIG. 4 is a schematic diagram of an auxiliary power supply having a current overload detection circuit in accordance with inventive arrangements.

An additional inventive arrangement, shown in FIG. 4, advantageously and elegantly provides for detection of current overload conditions on the −15 V output in the absence of negative-polarity bias voltages. Detection of a current overload condition on the −15 V output, when in the run mode, causes the power supply 10 to be switched into the standby mode. In FIG. 4, the negative supply voltage overload detection circuit 43 is coupled between the +15 V and −15 V outputs of power supply 10. The Zener diode Z6 is biased between the +15 V and −15 V outputs of the power supply 10, such that the base of transistor Q8 has a bias voltage that is equal to approximately −2 V when the −15 V output is nominally loaded. The Zener diode Z6 thus provides a level-shifting mechanism, or a dc offset, that enables the −15 V output to be compared against a positive reference voltage, which in this embodiment is the turn-on voltage of the base-emitter junction of transistor Q8, for detecting a current overload condition.

If, in response to a current overload condition, the −15 V output begins to drop toward a ground potential, the voltage at the base of transistor Q8 will also tend to move toward ground. Eventually, if the current overload condition persists and the −15 V output consequently reaches a predetermined threshold voltage level, the voltage at the base of transistor Q8 will become positive and will eventually become high enough, for example approximately 0.7 V, to turn on transistor Q8 to signal a current overload condition. Unlike fault condition detection circuit 42, where a current overload condition is signaled by a change in the conductive state of Zener diode Z4, Zener diode Z6 remains in a conductive state when a current overload condition is signaled by transistor Q8. The desired threshold level can be selected by an appropriate choice of the breakdown voltage of Zener diode Z6.

When transistor Q8 turns on, current is drawn from the base of transistor Q6, thereby turning transistor Q6 off. Thus, similarly to the detection of an overcurrent condition on the +15 V output, with transistor Q6 off, capacitor C4 can charge from the current through optocoupler U3. When the charge on capacitor C4 reaches approximately +10 V, transistor Q5 turns off, and there is no path for the current through optocoupler U3. In that case, although differential transistors Q3 and Q4 still detect the presence of the +23 V run supply, no current is conducted by the phototransistor of optocoupler U3. The raw B+supply turns on transistor Q2 due to the voltage divider formed at junction J1 by resistors R1, R2, R3 and R4. The control input CNTL of switching controller U1 is pulled low. The power supply 10 shuts off, protecting the loads coupled to the outputs.

When the +23 V run supply voltage drops, capacitor C4 is discharged through diode D6, which otherwise would be reverse biased by the presence of the +23 V run supply. Once capacitor C4 has discharged, the power supply 10 can be restarted unless there is still an overload condition on the output that prevents development of a sufficient output voltage to turn on transistor Q6 during the delay time in which the charge on capacitor C4 can rise to a sufficient voltage to turn off transistor Q5.

If capacitor C4 is not allowed enough time to fully discharge, for example if switched mode power supply 10 is shifted from the run mode to the standby mode and then back to the run mode in rapid succession, transistor Q5 will remain off. The run mode output voltages will thus be prevented from coming up and attaining their nominal output voltage levels.

Figure 5:
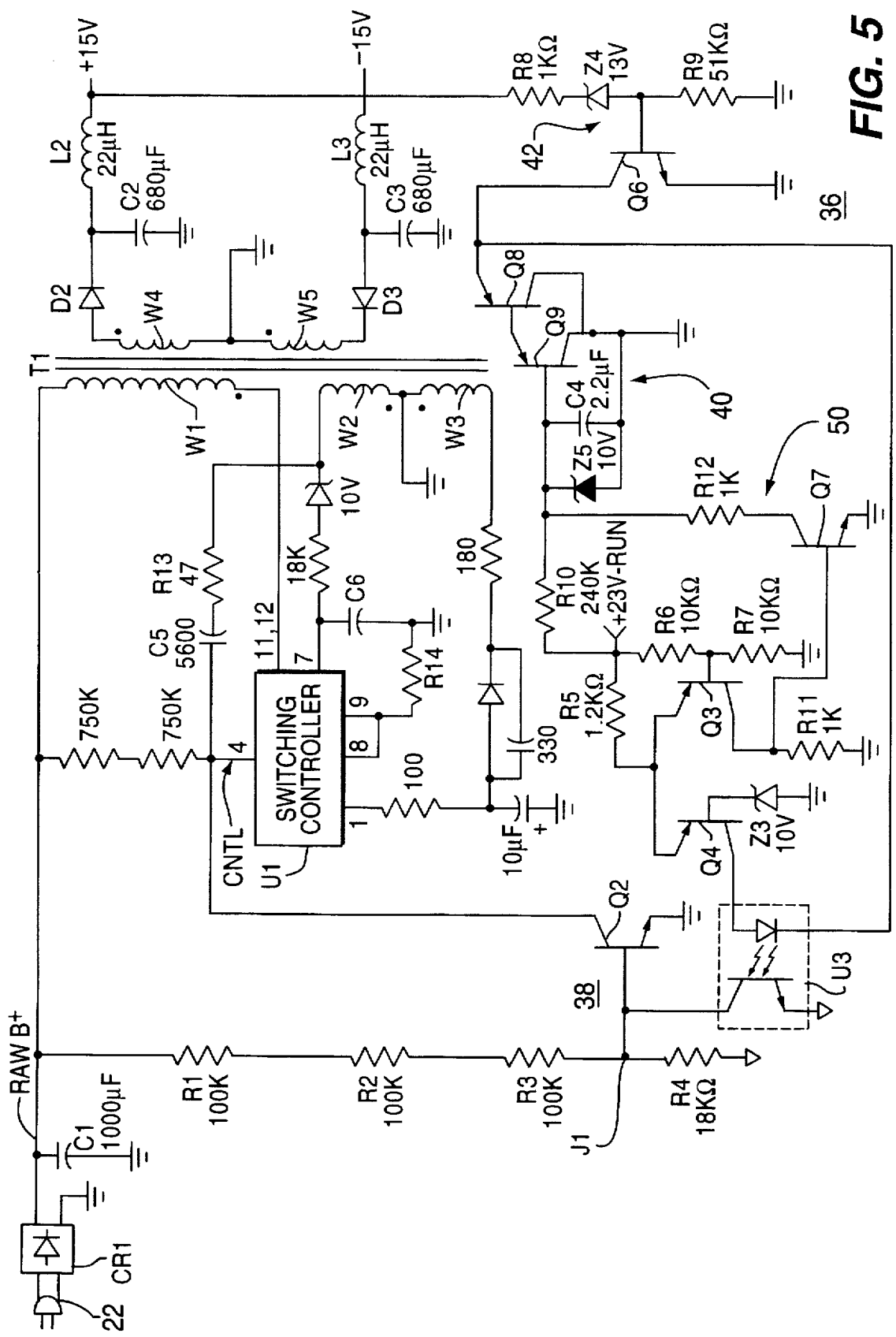
FIG. 5 is a schematic diagram of an auxiliary power supply having a quick-reset circuit in accordance with inventive arrangements.

A further inventive embodiment shown in FIG. 5 provides a quick-reset circuit 50 for rapidly discharging capacitor C4 when the +23 V run supply voltage drops. According to the invention, this function is achieved in a manner that interfaces with the circuits controlling switching between the run and standby modes as in FIG. 2.

In FIG. 5, the delay circuit 40 has a Zener diode Z5 in parallel with capacitor C4. When the +23 V run supply voltage comes up, capacitor C4 charges through resistor R10 to provide the delay time for the run mode output voltages to stabilize at approximately their nominal output voltage levels. Zener diode Z5 clamps the voltage across capacitor C4 to approximately +10 V to prevent damage to the base-emitter junctions of transistors Q8 and Q9, which are arranged in a Darlington configuration.

Once power supply 10 is in the run mode, transistor Q4 and the diode of optocoupler U3 conduct current, in a manner similar to the embodiment shown in FIG. 3. Unlike the embodiment in FIG. 3, however, this current is not used to charge capacitor C4. The arrangement of transistors Q8 and Q9 in a Darlington configuration results in only a minimal current flow in the base of transistor Q9. Thus, the charging rate of capacitor C4, and the delay time caused thereby, is determined exclusively by the time constant formed by resistor R10 and capacitor C4. This advantageously eliminates any variation in the charging rate of capacitor C4 due to the current amplification factor, or beta, of transistor Q5 in FIG. 3 or the Darlington arrangement of transistors Q8 and Q9 in FIG. 5.

Referring to FIG. 5, when power supply 10 is shifted into the standby mode, the +23 V run supply voltage starts to drop. As the run supply voltage drops below a level determined by the ratio of resistances in the voltage divider of resistances R6 and R7, current flow is redirected from transistor Q4 to transistor Q3. The current flowing through transistor Q3 establishes a voltage across resistor R11, which voltage biases reset transistor Q7 on. Capacitor C4 is thereby rapidly discharged to ground through resistor R12 and reset transistor Q7 before the +23 V run voltage has completely decayed.

It will be apparent to those skilled in the art that, although the invention has been described in terms of specific examples, modifications and changes may be made to the disclosed embodiments without departing from the essence of the invention. Accordingly, reference should be made to the appended claims, rather than to the foregoing specification, as indicating the true scope of the invention.

What is claimed is:

1. An arrangement for detecting a fault condition in a power supply which is switchable between operational and non-operational states in the absence of said fault condition, said arrangement comprising:

a switch control circuit for switching said power supply between said operational and non-operational states responsive to a control signal;

a first switch device coupled to said switch control circuit for providing a conduction path between a control terminal of said power supply and a source of reference voltage potential;

a source of an output voltage;

means for shifting the level of said output voltage; and, a second switch device responsive to said shifting means and coupled to said switch control circuit for determining a conductive condition of said conduction path.

2. the arrangement of claim 1, wherein said power supply utilizes bias voltages of uniform polarity.

3. The arrangement of claim 2, wherein said output voltage has a polarity that is opposite to the polarity of said bias voltages.

4. The arrangement of claim 1, wherein said shifting means comprises a Zener diode.

5. The arrangement of claim 4, wherein said second switch device comprises a transistor.

6. The arrangement of claim 5, wherein said Zener diode has an anode coupled to said source.

7. The arrangement of claim 6, wherein said Zener diode has a cathode coupled to a base of said transistor.

8. The arrangement of claim 7, wherein said transistor turns on to establish said non-conductive condition in said conduction path.

9. A power supply which is switchable between operational and non-operational states in the absence of a fault condition, said power supply comprising:

a switch device for providing a conduction path between a control terminal of said power supply and a source of reference voltage potential, wherein a conductive condition of said conduction path determines the operational state of said power supply;

first and second voltage sources providing first and second output voltages, respectively;

a Zener diode coupled between said first and second sources and providing a bias voltage which tracks one of said first and second output voltages; and, means for comparing said bias voltage with a reference voltage, said comparing means coupled to said switch device for determining said conductive condition of said conduction path.

10. The power supply of claim 9, wherein said first and second output voltages have opposite polarities.

11. The power supply of claim 9, wherein said reference voltage has a positive polarity.

12. The power supply of claim 9, wherein said reference voltage has a polarity opposite to the polarity of one of said first and second output voltages.

13. The power supply of claim 9, wherein said comparing means comprises a transistor.

14. The power supply of claim 13, wherein said transistor is of a bipolar-junction type, and said reference voltage comprises a turn-on voltage of a base-emitter junction of said transistor.

* * * * *

UNITED STATES PATENT AND TRADEMARK OFFICE
CERTIFICATE OF CORRRECTION

Page 1 of 2

PATENT NO. : 5,777,862
DATED : July 7, 1998
INVENTOR(S) : Kevin Michael Williams, et. al.

It is certified that error appears in the above-identified patent and that said Letters Patent is hereby corrected as shown below:

Title page, item [56], insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 3 | 7 | 3 | 3 | 4 | 9 | 8 | 05/1973 | Watson | | | |
| | | 4 | 9 | 1 | 4 | 5 | 6 | 0 | 04/1990 | Oh et al. | | | |
| | | 4 | 8 | 0 | 1 | 8 | 2 | 4 | 01/1989 | Fellinger et al. | | | |
| | | 3 | 8 | 3 | 1 | 0 | 7 | 7 | 08/1974 | Richeson, Jr. | | | |
| | | 4 | 2 | 8 | 3 | 6 | 7 | 4 | 08/1981 | Kominami et al. | | | |
| | | | | | | | | | | | | | |

UNITED STATES PATENT AND TRADEMARK OFFICE
CERTIFICATE OF CORRRECTION

Page 2 of 2

PATENT NO. : 5,777,862
DATED : July 7, 1998
INVENTOR(S) : Kevin Michael Williams, et. al.

It is certified that error appears in the above-identified patent and that said Letters Patent is hereby corrected as shown below:

Title page, item [56], insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 1 | 1 | 76 | 5 | A1 | 02/1987 | EPO | | | | |
| | | 2 | 2 | 4 | 8 | 98 | 2 | A | 04/1992 | Great Britain | | | | |
| | | 0 | 2 | 5 | 4 | 21 | 4 | A1 | 01/1988 | EPO | | | | |
| | | 56- | 1 | 6 | 4 | 6 | 3 | 3 | 12/1981 | Japan | | | | |
| | | 02- | 0 | 3 | 6 | 6 | 1 | 1 | 02/1990 | Japan | | | | |
| | | 05- | 2 | 5 | 0 | 0 | 4 | 8 | 09/1993 | Japan | | | | |

Signed and Sealed this

Sixth Day of April, 1999

Attest:

Q. TODD DICKINSON

Attesting Officer

Acting Commissioner of Patents and Trademarks